United States Patent [19]

Armstrong, Jr.

[11] Patent Number: 5,167,058
[45] Date of Patent: Dec. 1, 1992

[54] CONTINUOUS RECIPROCATING TUBE-STRIPPING APPARATUS

[75] Inventor: Robert S. Armstrong, Jr., Manasquan, N.J.

[73] Assignee: Armstrong & Sons, Inc., Manasquan, N.J.

[21] Appl. No.: 645,189

[22] Filed: Jan. 18, 1991

[51] Int. Cl.⁵ .................. B23P 19/04; B23P 15/26
[52] U.S. Cl. ............................. 29/252; 29/261; 29/262; 29/282; 29/426.3; 29/426.5; 29/890.031; 72/316
[58] Field of Search ................ 29/252, 258–266, 29/280, 282, 890.03, 890.031, 402.03, 426.5, 426.3, 726; 138/89, 97; 165/76; 72/316, 402, 457

[56] References Cited

U.S. PATENT DOCUMENTS

| | | | |
|---|---|---|---|
| 760,148 | 5/1904 | Poppenhusen | 29/282 X |
| 966,461 | 8/1910 | Messinger | 29/252 X |
| 1,521,382 | 12/1924 | McPherson | 29/252 |
| 2,003,756 | 5/1934 | Nagel | 29/261 X |
| 3,069,761 | 7/1959 | Sommer | 29/252 |
| 3,149,412 | 9/1964 | Curfman et al. | 29/726 |
| 3,174,218 | 3/1965 | McConaha | 29/263 |
| 3,787,950 | 1/1974 | Bagby | 72/316 |
| 3,789,648 | 2/1974 | Ames | 72/316 |
| 3,837,062 | 9/1974 | Ohmstede | 29/726 |
| 3,857,158 | 12/1974 | Costello | 29/890.031 |
| 3,858,300 | 1/1975 | Borel | 29/263 X |
| 3,908,258 | 9/1975 | Barty | 29/252 |
| 3,925,874 | 12/1975 | Moyers | 29/282 |
| 3,954,187 | 5/1976 | van der Woerd | 29/726.5 |
| 3,958,698 | 5/1976 | van der Woerd | 29/726 X |
| 4,000,556 | 1/1977 | Ciminero | 29/890.031 |
| 4,044,444 | 8/1977 | Harris | 29/890.031 X |
| 4,095,335 | 6/1978 | Lassarat | 29/726 |
| 4,125,928 | 11/1978 | Cawley et al. | 29/282 |
| 4,161,810 | 7/1979 | Beard et al. | 29/890.031 |
| 4,180,903 | 1/1980 | Hannigan, Jr. | 72/402 X |
| 4,292,731 | 10/1981 | Filer | 29/726 |
| 4,369,569 | 1/1983 | Armstrong, Jr. et al. | 29/252 X |
| 4,406,856 | 9/1983 | Wilkins et al. | 29/890.031 X |
| 4,571,802 | 2/1986 | Calhoun et al. | 29/890.031 |

FOREIGN PATENT DOCUMENTS

| | | | |
|---|---|---|---|
| 2311629 | 12/1976 | France | 29/890.031 |
| 52-28051 | 3/1977 | Japan | 29/890.031 |

Primary Examiner—Joseph M. Gorski
Assistant Examiner—Peter Dungba Vo
Attorney, Agent, or Firm—Ralph W. Selitto, Jr.

[57] ABSTRACT

A substantially continuous tube-pulling operation is performed through the use of a plurality of pulling deivces, each of which is designed to partially pull a tube from its associated holder. By operating the pulling devices in a consecutive and repetitive fashion, the tube can be completely stripped from the holder in a single continuous operation.

14 Claims, 3 Drawing Sheets

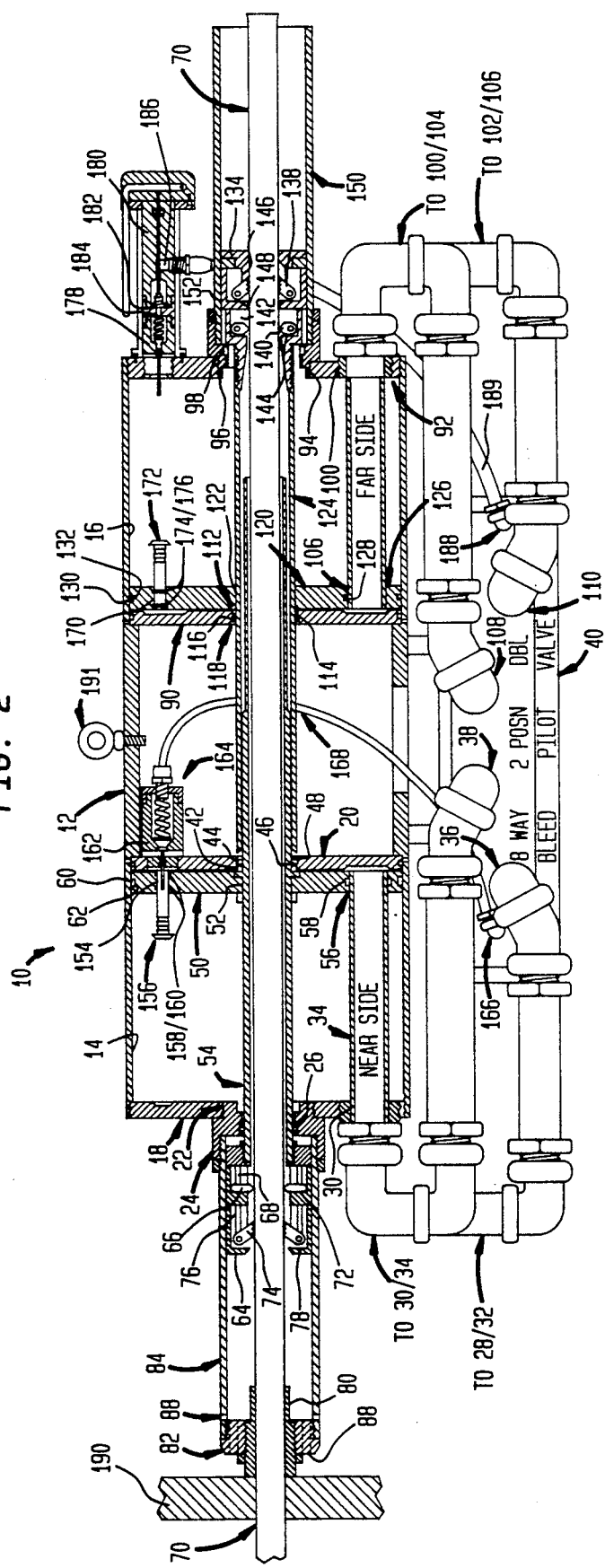

CONTINUOUS RECIPROCATING TUBE-STRIPPING APPARATUS

FIELD OF THE INVENTION

This invention generally relates to tube-stripping and/or tube-pulling apparatus and, more particularly, to apparatus that strip tubes from the confines of the tube sheets used in heat exchangers, condensers and the like.

BACKGROUND OF THE INVENTION

It is customary to replace heat exchanger tubes after they are no longer structurally sound, owing to corrosion or pitting, and when they commence leaking fluid. Pneumatically or hydraulically operated devices have replaced manpower to extract these tubes prior to making the necessary replacements.

In the past, devices have been developed to facilitate breaking the tube from the tube sheet that surrounds the tube. One such device is disclosed in U.S. Pat. No. 4,369,569, having the same assignee as the application herein. This tube-pulling device breaks the tube from the tube sheet by gripping the inner wall of the tube and then extracting the tube a short, specified distance. Because the device is unable to withdraw the tube entirely from the tube sheet, the user has to cut-off the standing portion of the tube and then reapply the device or use a completely different device to withdraw the remainder of the tube.

U.S. Pat. No. 3,857,158 discloses a tube-pulling device which utilizes a pair of pistons which move concurrently to effect removal of a tube. More particularly, after the pistons cooperate to pull the tube a relatively short distance, the tube is released so that the device can regrip the tube in preparation for the resumption of the tube-pulling operation. The disadvantage of this device is that it only pulls the tube a relatively short distance before the tube-pulling operation ceases, at least until the device can obtain a new grip on the tube in order to resume the tube-pulling operation. This intermittent and incremental pulling is done in short movements and is, therefore, very inefficient, as well as time consuming.

SUMMARY OF THE INVENTION

The problems and disadvantages of the devices discussed above are overcome in accordance with the present invention by providing an apparatus and method adapted to pull a tube from an associated holder, such as a tube sheet, in a substantially continuous and therefore time-saving fashion. More particularly, the present invention employs a plurality of pulling mechanisms (e.g., piston/cylinder assemblies) which are equipped with gripping mechanisms for releasably gripping the tube and which are controlled in such a manner that they take turns in pulling the tube from its holder. The pulling mechanisms can be controlled such that they perform their pulling operations consecutively (i.e., successively without interruption) to thereby pull the tube from its holder in a substantially continuous fashion.

If the pulling mechanisms are a pair of piston/cylinder assemblies, as one piston is extended (i.e., moved away from its home or start position) to perform its tube-pulling operation, the other piston is being retracted (i.e., returned to its home or start position) in preparation for the commencement of its tube-pulling operation. The tube-pulling operations performed by the pistons can be controlled such that they are carried out consecutively (i.e., successively without interruption) and repetitiously, whereby the tube can be completely stripped from its holder in a single continuous operation.

BRIEF DESCRIPTION OF THE DRAWINGS

For a more complete understanding of the present invention, reference may be had to the following description of an exemplary embodiment considered in connection with the accompanying drawings, in which:

FIG. 2 is a longitudinal cross-sectional view of the tube-stripping apparatus of FIG. 1, the apparatus being shown after the tube has been pulled from the tube sheet;

DESCRIPTION OF THE EXEMPLARY EMBODIMENT

Figure 1:
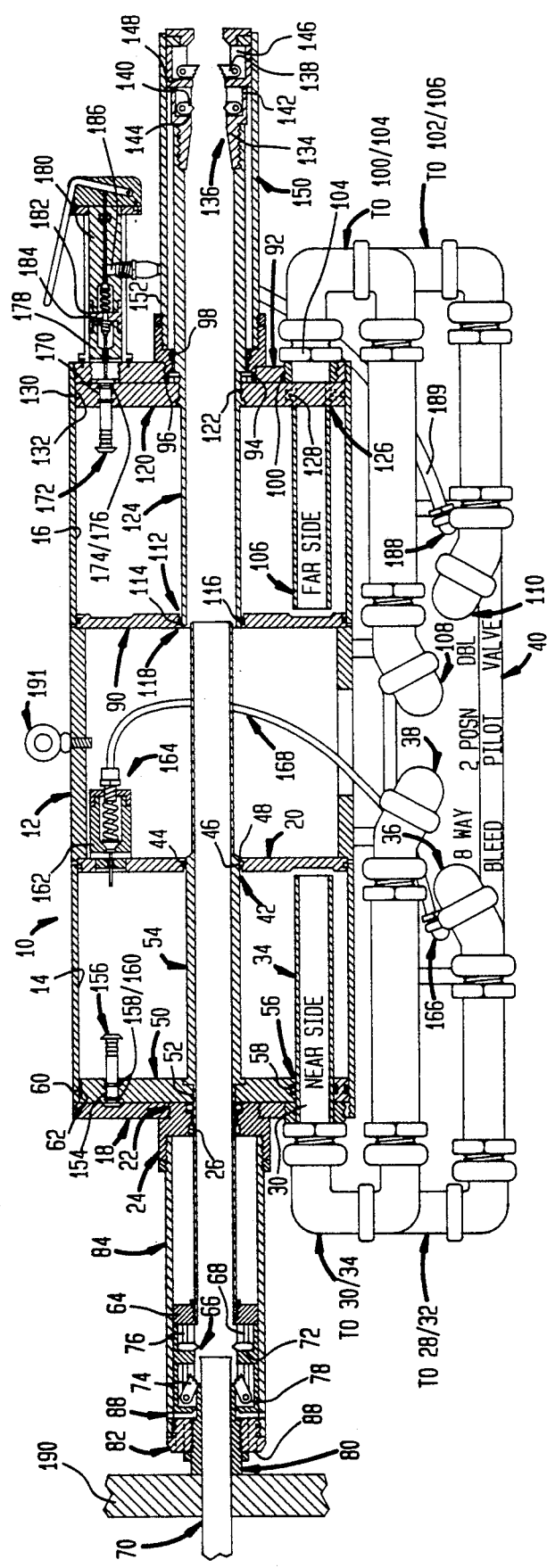
FIG. 1 is a longitudinal cross-sectional view of a continuous tube-stripping apparatus constructed in accordance with the present invention, the apparatus being shown gripping an exposed tube to be pulled from a tube sheet prior to commencement of a continuous tube-stripping operation.

Referring to FIGS. 1 and 2, there is shown a continuous tube stripping machine 10, including a housing 12, which is divided into a front pneumatic cylinder 14 and a rear pneumatic cylinder 16, which are coaxially arranged with respect to the central longitudinal axis of the housing 12.

Figure 5:
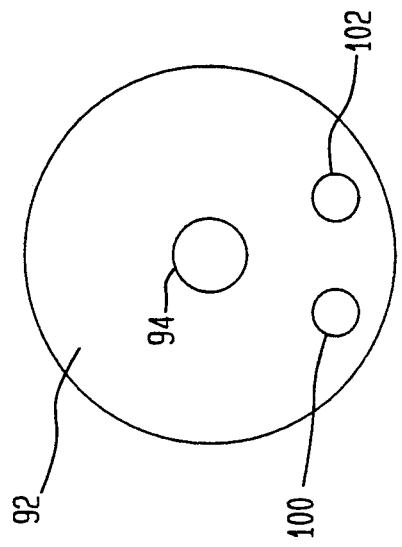
FIG. 5 is a porting schematic which shows the port arrangement for a front cylinder head employed by the tube-stripping apparatus of FIGS. 1 and 2.
Figure 3:
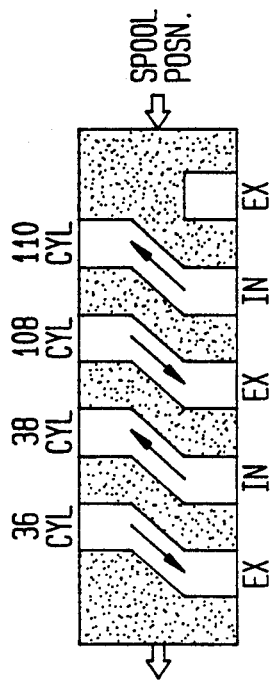
FIG. 3 is a valve porting schematic which shows the movement of air through a double-bleed pilot valve employed by the apparatus of FIGS. 1 and 2 when the valve is in a first position.
Figure 4:
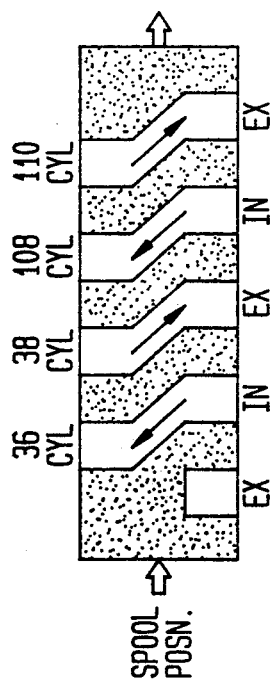
FIG. 4 is a valve porting schematic which shows movement of air through the double-bleed pilot valve of FIG. 3 when the valve is in a second position.

The front cylinder 14 includes a front cylinder head 18 (FIG. 5) and a rear cylinder head 20. The front cylinder head 18 has a bore 22, which threadedly receives a gland 24, which includes a rod wiper and seal 26. The front cylinder head 18 includes two feed ports 28, 30, which threadedly receive two fittings 32, 34. One fitting is in the form of a nipple 32, which is threadedly received in one of the ports 28. The other fitting is in the form of a feed tube 34 which extends to a location in close proximity to the rear cylinder head 20. Both of the fittings are attached to cylinder ports 36, 38 (valve porting for which is shown in FIG. 3) of an eight-way, two-position double bleed pilot valve 40. The rear cylinder head 20 includes a bore 42 which is provided with an integrally formed gland 44, including a rod seal 46 and a rod wiper 48. A piston 50 is mounted in the front cylinder 14 for reciprocating movement between the front cylinder head 18 and the rear cylinder head 20. The piston 50 includes a central bore 52 which threadedly receives a hollow piston rod 54. Another bore 56 in the piston 50 slidably receives the feed tube 34 (of the fitting), a rod seal 58 preventing leakage across the piston 50. Likewise, leakage across the piston 50 is prevented by a piston seal 60 mounted in an annular groove 62 provided in the outer circumferential edge of the piston 50. The rear portion of the piston rod 54 is slidably received in the gland 44 of the rear cylinder head 20. The front portion of the piston rod 54 is slidably received in the gland 24 in the front cylinder head 18. The front end of the piston rod 54 threadedly receives a jaw holder 64. Four tube centering dogs 66 (only two of which are disclosed owing to the perspective view of FIGS. 1 and 2) are pivotally mounted within the jaw holder 64, each dog 66 being urged by a spring 68 to make contact with a tube 70. The dogs 66 are arranged such that the tube 70 will be maintained in the center of the jaw holder 64. A shoulder 72, extending radially into the jaw holder 64, defines the rest position of the dogs 66. Four gripping jaws 74 (only two of which are disclosed owing to the perspective view of FIGS. 1 and 2) are also pivotally mounted within the jaw holder 64 forward of the centering dogs 66. Springs 76 urge the gripping jaws 74 into contact with the tube 70. A shoulder 78 limits the maximum extension of the jaws 74. A bucking sleeve 80 extends axially into the jaw holder 64 through an opening in the front end thereof. The bucking sleeve 80 maintains the gripping jaws 74 in an open position when the piston 50 and piston rod 54 are in their forwardmost positions. A cap 82 is threadedly attached to the bucking sleeve 80. A brace 84 is threadedly attached at its forward end to the cap 82 and at its rearward end to the gland 24. Holes 88 in the cap 82 and the brace 84 permit dirt and other foreign materials to be discharged from within the brace 84 to prevent the buildup of dirt and other foreign materials around the gripping jaws 74.

The front piston 50 has a bore 154 which slidably receives an anticipator pin 156. O-ring seals 158 in an integral gland 160 prevent air leakage across the piston 50 and create a friction fit. A bleed valve 162 is threadedly attached to the rear cylinder head 20 of the front cylinder 14. The intake port 164 of this bleed valve 162 communicates with one bleed port 166 of the bleed pilot valve 40 by flexible air tubing 168.

The use and positioning of the anticipator pin 172 and the bleed valve 178 ensures that the rear piston 120 will not strike against the rear cylinder head 92 of the rear cylinder 16 and that in a simultaneous manner the front piston 50 will not strike against the front cylinder head 18 of the front cylinder 14 (FIG. 1).

Figure 6:
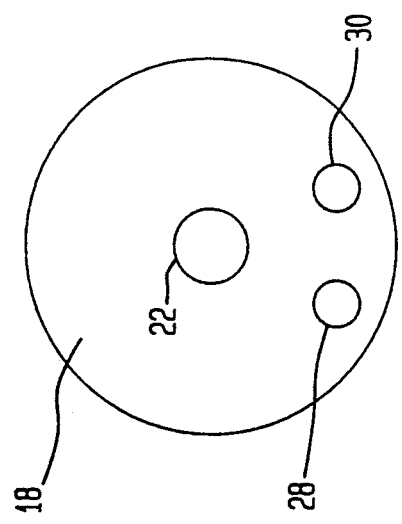
FIG. 6 is a porting schematic which shows the port arrangement for a rear cylinder head employed by the tube-stripping apparatus of FIGS. 1 and 2.

The rear cylinder 16 includes a front cylinder head 90 and a rear cylinder head 92 (FIG. 6). The rear cylinder head 92 has a bore 94 which threadedly receives a gland 96 which includes a rod wiper and seal 98. The rear cylinder head 92 includes two feed ports 100, 102 which threadedly receive two fittings 104, 106. One fitting is in the form of a nipple 104 which is threadedly received in one of the ports 100. The other fitting is in the form of a feed tube 106 which extends to a location in close proximity to the front cylinder head 90. Both of the fittings are attached to the cylinder ports 108, 110 (valve porting for which is shown in FIG. 3) of an eight-way, two-position double bleed pilot valve 40. The front cylinder head 90 includes a bore 112 which is provided with an integrally formed gland 114 including a rod seal 116 and a rod wiper 118. A piston 120 is mounted in the rear cylinder 16 for reciprocating movement between the front cylinder head 90 and the rear cylinder head 92. The piston 120 includes a central bore 122 which threadedly receives a hollow piston rod 124. Another bore 126 in the piston 120 slidably receives the feed tube 106 (of the fitting), a rod seal 128 preventing leakage across the piston 120. Likewise, leakage across the piston 120 is prevented by a piston seal 130 mounted in an annular groove 132 provided in the outer circumferential edge of the piston 120. The rear portion of the piston rod 124 is slidably received in the gland 96 of the rear cylinder head 92. The front portion of the piston rod 124 is slidably received in the gland 114 in the front cylinder head 90. The rear piston rod 124 is of a larger diameter than the front piston rod 54 for accommodating of the same. The rear end of the piston rod 124 threadedly receives a jaw holder 134. The leading portion of the jaw holder 134 is in the form of an internally tapered cone 136 to guide the tube 70 toward the rear gripping jaws 138. Four tube centering dogs 140 (only two of which are disclosed owing to the perspective view of FIGS. 1 and 2) are pivotally mounted within the jaw holder 134, each dog 140 being urged by a spring 142 to make contact with the tube 70. The dogs 140 are arranged such that the tube 70 will be maintained in the center of the jaw holder 134. A shoulder 144, extending radially into the jaw holder 134, defines the rest position of the dogs 140. Four gripping jaws 138 (only two of which are disclosed owing to the perspective view of FIGS. 1 and 2) are also pivotally mounted within the jaw holder 134 rearward of the centering dogs 140. Springs 146 urge the gripping jaws 138 into contact with the tube 70. A shoulder 148 limits the maximum extension of the jaws 138. A rear shield 150 is threadedly attached at its forward end to the rear gland 96. Holes 152 in the rear shield 150 permit dirt and other foreign materials to be discharged from within the rear shield 150 to prevent the buildup of dirt and other foreign materials around the jaw holder 134.

The rear piston 120 has a bore 170 which slidably receives an anticipator pin 172. O-ring seals 174 in an integral gland 176 prevent air leakage across the piston 120 and create a friction fit. A bleed valve 178 is threadedly attached to the rear cylinder head 92 of the rear cylinder 16. A trigger bleed valve 180 is threadedly attached to this bleed valve 178 so that the trigger bleed valve 180 exhaust port 182 communicates with the bleed valve 178 intake port 184. The intake port 186 of the trigger bleed valve 180 communicates with a second bleed port 188 of the bleed pilot valve 40 via a flexible air tube 189.

The use and positioning of the anticipator pin 156 and the bleed valve 162 ensures that the front piston 50 will not strike against the rear cylinder head 20 of the front cylinder 14 and that in a simultaneous manner the rear piston 120 will not strike against the front cylinder head 90 of the rear cylinder 16 (FIG. 2).

In operation, the tube-pulling apparatus disclosed in U.S. Pat. No. 4,369,569, for example, or any similar device is used to break the tube 70 free from its rolled joint in the tube sheet 190 and to extract the tube 70 a short distance from the tube sheet 190. The continuous tube-stripper of the present invention is then applied over the exposed end of the tube 70 with the piston 50 and piston rod 54 being in their forwardmost or extended positions (i.e., with the machine at its rest position). In such a position, the gripping jaws 74 are maintained out of contact with the tube 70 by the bucking sleeve 80, the flared end of the tube being positioned forward of the centering dogs 66 so that the tube-stripper 10 can be moved from the tube 70 in the event that the tube 70 cannot be pulled any further from the tube sheet 190 by the tube-stripper 10 (FIG. 1). In order to initiate a continuous tube stripping operation, the trigger valve 180 is opened which permits control air to vent through the bleed valve 178 mounted in the rear cylinder head 92. This shifts the position of the bleed pilot valve 40 such that service air pressure is conducted to the front side of the front piston 50 through the fitting 32, while simultaneously, service air pressure is conducted to the backside of the rear piston 120 through the fitting 104. The service air pressure supplied through the fittings causes the rearward or retracted movement of the front piston 50 and piston rod 54 (in a first direction away from the tube sheet 190) while causing the simultaneous forward or extended movement of the rear piston 120 and its associated piston rod 124 (in a second direction toward the tube sheet 190). As the two piston rods approach each other the front piston rod 54 is received within the rear piston rod 124. As the front piston rod is moved rearward, the gripping jaws 74 are released by the bucking sleeve 80 so as to permit them to pivot into contact with the tube 70. With the gripping jaws 74 in firm engagement with the tube 70, the tube is retracted conjointly with the piston 50 and piston rod 54. During the pulling operation, the centering dogs 66 maintain the tube 70 concentrically within the gripping jaws 74. Just prior to the front piston 50 reaching the rear cylinder head 20 of the front cylinder 14, an anticipator pin 156 carried by the piston 50 actuates a bleed valve 162 so as to control the pilot valve 40 in such a manner that service air pressure is supplied through the fitting 34 to the backside of the front piston 52, while simultaneously, service air pressure is conducted through a fitting 106 to the front side of the rear piston 120. The service air pressure supplied through the fittings causes the forward or extended movement of the front piston 50 and its associated piston rod 54 and the simultaneous rearward or retracted movement of the rear piston 120 and its associated piston rod 124.

FIG. 2 shows the condition of the tube-stripper 10 when the tube 70 has been retracted far enough into the rear piston rod 124 so that the tapered cone 136 can guide the tube 70 between the centering dogs 140, which swing open to permit the passage of the flared end of the tube 70. The flared end of the tube 70 swings the rear gripping jaws 138 from a closed position to a tube gripping position. At this juncture, the rear piston 120 urges the piston rod 124 and its associated gripping jaws 138 to commence pulling the tube, enabling the front piston 50, the piston rod 54 and its associated gripping jaws 74 to extend to their forwardmost or extended position to grip a portion of the tube proximate the tube sheet so that the tube-stripping operation can continue.

Because the pistons and their associated piston rods operate simultaneously in opposite directions and consecutively in the same direction, when the forward gripping mechanism is pulling, the rear gripping mechanism is recovering and vice-versa. Thus, because of the operation of the pulling mechanisms, the tube is pulled in a substantially continuous manner from the tube sheet by the tube stripper without hesitation.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

I claim:

1. Apparatus for pulling a tube from a holder, comprising a housing having a passageway extending therethrough along a center longitudinal axis thereof, said passageway being sized and shaped so as to allow the passage of the tube as the tube is pulled away from the holder; first pulling means, positioned within said housing such that said passageway extends through said first pulling means, for pulling the tube in a first direction away from the holder, said first pulling means including a first cylinder and a first piston mounted within said first cylinder for reciprocating movement in said first direction and a second direction opposite to said first direction; first engaging means mounted on said first pulling means for engaging the tube when said first pulling means is pulling the tube in said first direction and for disengaging the tube when said first pulling means is moving in said second direction; second pulling means, positioned within said housing such that said passageway extends through said second pulling means, for pulling the tube in said first direction, said second pulling means including a second cylinder and a second piston mounted within said second cylinder for reciprocating movement in said first and second directions; second engaging means mounted on said second pulling means for engaging the tube when said second pulling means is pulling the tube in said first direction and for disengaging the tube when said second pulling means is moving in said second direction; and controlling means for controlling said first and second pulling means such that said first and second pulling means are successively moved in said first direction and such that said second pulling means is moved in said second direction as said first pulling means is moved in said first direction and said first pulling means is moved in said second direction as said second pulling means is moved in said first direction, whereby the tube is pulled away from the holder in a substantially continuous fashion.

2. The Apparatus according to claim 1, wherein said first piston includes a first anticipator pin slideably mounted therein, and wherein said second piston includes a second anticipator pin slideably mounted therein.

3. The Apparatus according to claim 2, wherein said first pulling means further includes a first piston rod having a first bore therethrough, said first piston rod being arranged coaxially about said passageway and mounted to said first piston for conjoint movement therewith in said first and second directions, and wherein said second pulling means further includes a second piston rod having a second bore therethrough, said second piston rod being arranged coaxially about said passageway and mounted to said second piston for conjoint movement therewith in said first and second directions, and said second bore having an inner diameter greater than an outer diameter of said first bore so that said first piston rod is received in said second piston rod when said first piston is moved in said first direction and said second piston is moved in said second direction.

4. The Apparatus according to claim 3, wherein said controlling means includes first feeding means for feeding fluid to said first cylinder so as to move said first piston in said first and second directions and second feeding means for feeding fluid to said second cylinder so as to move said second piston in said first and second directions.

5. The Apparatus according to claim 4, wherein said first feeding means includes at least two feed ports communicating with said first cylinder of said first pulling means, and wherein said second feeding means includes at least two other feed ports communicating with said second cylinder of said second pulling means.

6. The Apparatus according to claim 5, wherein said first and second feeding means are connected to a source of compressed air.

7. The Apparatus according to claim 6, wherein said controlling means includes sequencing means for sequencing the flow of compressed air from said source to said first and second feeding means.

8. The Apparatus according to claim 7, wherein said sequencing means includes a pilot valve.

9. The Apparatus according to claim 7, wherein said controlling means includes initiating means for initiating delivery of compressed air from said source to said controlling means.

10. The Apparatus according to claim 7, wherein said controlling means further includes a first bleed valve positioned in said first cylinder so as to be engageable by said first actuator pin as said first piston moves in said first direction within said first cylinder and a second bleed valve positioned in said second cylinder so as to be engageable by said second actuator pin as said second piston moves in said first direction within said second cylinder.

11. The Apparatus according to claim 7, wherein said first engaging means includes first gripping means pivotally mounted to said first piston rod and pivotal relative thereto between a first position in which said first gripping means engages the tube and a second position in which said first gripping means disengages the tube, and wherein said second engaging means includes second gripping means pivotally mounted to said second piston rod and pivotal relative thereto between a first position in which said second gripping means engages the tube and a second position in which said second gripping means disengages the tube.

12. The Apparatus according to claim 11, wherein said first engaging means further includes urging means for urging said first gripping means into its said first position in response to said urging means contacting the holder.

13. The Apparatus according to claim 11, wherein said first engaging means further includes first centering means for centering the tube in said first bore of said first piston rod, and wherein said second engaging means further includes second centering means for centering the tube in said second bore of said second piston rod.

14. The Apparatus according to claim 13, wherein each of said first and second centering means includes a plurality of pivotal dogs.

* * * * *